United States Patent [19]
Takamoto et al.

[11] Patent Number: 5,471,408
[45] Date of Patent: Nov. 28, 1995

[54] METHOD FOR OPTIMIZING RESOURCE ALLOCATION AND AN APPARATUS USING THE METHOD

[75] Inventors: Masanori Takamoto, Hitachi; Naoyuki Yamada; Yasuhiro Kobayashi, both of Katsuta, all of Japan

[73] Assignee: Hitachi, Ltd., Tokyo, Japan

[21] Appl. No.: 92,917

[22] Filed: Jul. 19, 1993

[30] Foreign Application Priority Data

Aug. 3, 1992 [JP] Japan ..................................... 4-226465

[51] Int. Cl.⁶ .................................................. G06F 17/00
[52] U.S. Cl. .................................................. 364/578
[58] Field of Search ..................................... 364/578, 151, 364/148, 402

[56] References Cited

U.S. PATENT DOCUMENTS

| | | | |
|---|---|---|---|
| 3,828,171 | 8/1974 | Griffin | 364/151 |
| 4,910,660 | 3/1990 | Li | 364/151 |
| 4,975,827 | 12/1990 | Yonezawa | 364/151 |
| 5,229,948 | 7/1993 | Wei et al. | 364/402 |

FOREIGN PATENT DOCUMENTS 8501807  3/1985  WIPO ..................................... 364/151

*Primary Examiner*—Ellis B. Ramirez
*Attorney, Agent, or Firm*—Antonelli, Terry, Stout & Kraus

[57] ABSTRACT

A resource allocation optimization model includes linear constraints, allocation states of each object represented by 0, 1 variables of which the number is the same as the number of divided regions covering the whole allocation base region and an objective function described as the quadratic summation of resource stacks allocated to each divided region. In an optimizing process, variables having values which are to be changed are iteratively selected by a variable selection rule until it is judged that another variable change can not improve the objective function. The variable selection rule is characterized by using an evaluation index simply evaluating a value change of the objective function, defined by the inner product of a evaluation vector representing the present resource allocation states and a vector of a new resource allocation corresponding to a newly selected variable of a object, and selecting the next variable which minimizes the evaluation index.

4 Claims, 13 Drawing Sheets

METHOD FOR OPTIMIZING RESOURCE ALLOCATION AND AN APPARATUS USING THE METHOD

BACKGROUND OF THE INVENTION

The present invention relates to a method for optimizing resource allocation having general linear constraints and a nonlinear objective function and an apparatus using the method. The invention relates especially to a work scheduling apparatus which efficiently and automatically produces a superior plan as to plant construction scheduling while satisfying various given conditions.

Methods using linear programming or a branch and bound method as to general combinatorial optimization problems are described in "Solution of Large Scale 0–1 Integer Planning Problem", by Ellis L. Jhonson et al., Operations Research, Vol. 33, No. 4, July–August, 1985. Further, methods as to maximizing a positive definite quadratic function are described in "Nonlinear Programming Method", by H. Konno and H. Yamashita, NIKKAGIREN, 1978.

An apparatus for work scheduling support which has the aim of leveling worker resource stacks by using a constrained network management method was proposed in Japanese Patent Laid-Open No. 162463 (1990). And as to work progress managing, Japanese Patent Laid-Open No. 58169 (1991), was proposed. The above-mentioned methods describe constraints among tasks in a network and successively improve an evaluating function for leveling worker resource stacks in the network.

In conventional methods for solving combinatorial optimization problems based on the branch and bound method using successive search procedures, the Monte-Carlo method and the generic algorithm which takes a statistical approach are not effectual for a the large scale problem because use of them is restricted to comparatively small scale problems due to their time consuming computation. Generally, conventional combinatorial optimization algorithms can be applied only to smaller scale problems having hundreds of variables, while linear programming which treats continuous variables is applicable to large scale problems having tens of thousands of variables. Because conventional combinatorial optimization methods successively check for every searched point, they consume a great amount of computing time for a large scale planning problem.

SUMMARY OF THE INVENTION (1) Objects of the Invention:

The present invention aims to improve efficiency of searching for an optimal solution of the combinatorial optimization problem and to automatically obtain a solution of a large scale problem.

(2) Method Solving the Problem

The present invention operates to achieve the above-mentioned object by dividing variables of a resource allocation model, describing a problem minimizing a quadratic objective function under plural linear constraints, into basic variables and non-basic variables, and provides a variable sweep out rule wherein a non-basic variable negatively minimizing the inner product of a column vector of a coefficient matrix, corresponding to each non-basic variable, and the raw vector, obtained from the product of the basic matrix and the basic solution vector in the present step, is then selected as a basic variable. And, the replacement of a basic variable by the variable sweep out rule is repeated until another non-basic variable making the inner product negative can no longer be found.

The optimization procedure based on the variable sweep out rule can be applied to resource allocation problems as one type of combinatorial problem. In the present invention, the optimal allocation model comprises allocation constraints, allocation states represented by 0 or 1 of the same number of variables as divided regions over the whole allocation region, and an objective function represented as the quadratic summation of the resource stacks allocated to each divided region. The application of the variable sweep out rule to the optimal allocation problem using an optimal allocation model is described in more detail as follows. In the variable sweep (referred to as searched point selection or variable selection) rule, the evaluation index simply evaluating a change amount of the objective function in changing a non-basic value variable from 0 to 1 is defined by the inner product of the vector obtained from the resource allocation stack vector used in the quadratic objective function and the vector representing a new resource allocation of each allocation object. In accordance with the rule, a variable negatively minimizing the evaluation index is selected as a candidate optimizing the resource allocation.

In the resource allocation planning to which the present invention is applied, plural evaluation items, a priority in the evaluation items, and restrictions to resource allocations, inputted by using appropriate input means as control information for optimizing a process, can be treated. Thereby, the resource allocation planning is flexibly and automatically processed to meet various required conditions.

Furthermore, in the present invention, interactive interfaces are provided for displaying intermediate results of an optimizing process and the optimizing process can be corrected based on the displayed intermediate results by user inputs.

DETAILED DESCRIPTION OF THE EMBODIMENTS

Hereinafter, details of the present invention will be explained based on various embodiments with reference to drawings.

(Embodiment 1)

An embodiment of the present invention, relating to a method for optimally allocating resources to allocation objects, will be explained by reference to FIGS. 1–8.

Figure 1:
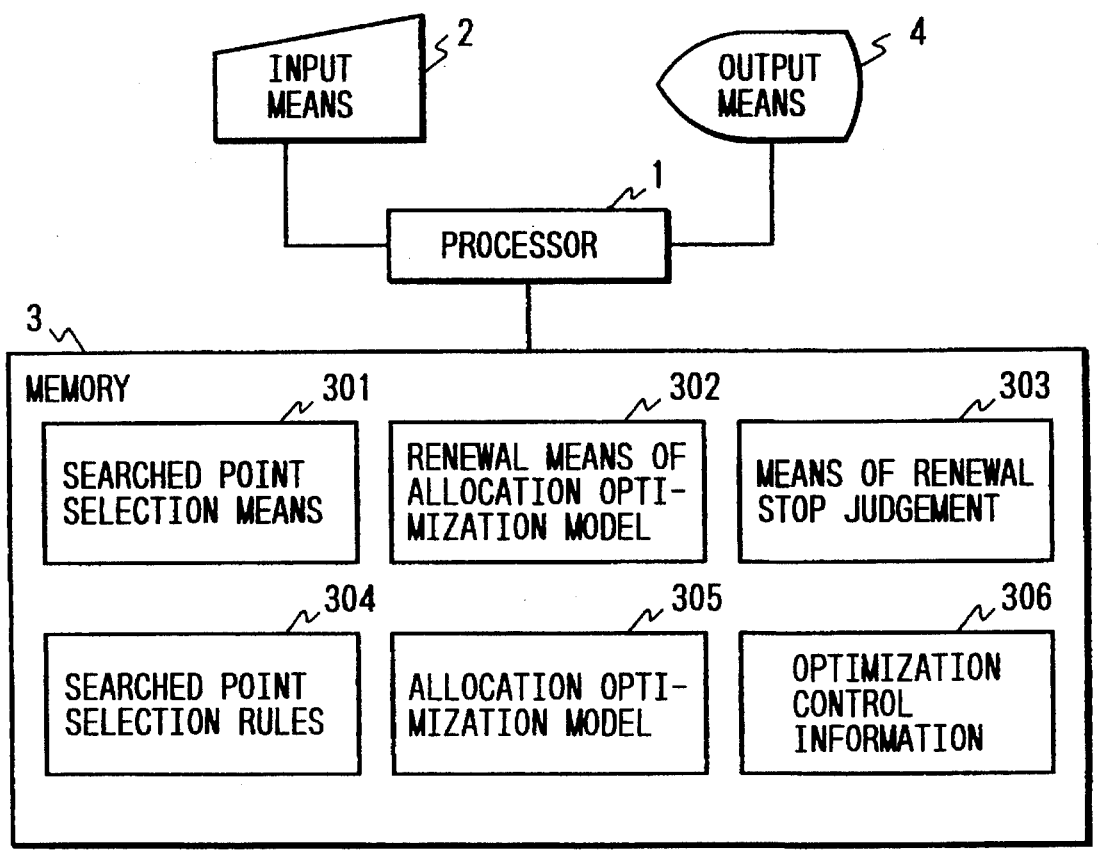
FIG. 1 is a schematic diagram of an example of an apparatus realizing the present invention.

An example of apparatus realizing the present invention is shown in FIG. 1. The apparatus consists of an processor 1, a input device 2, and a memory 3 including searched point selection means 301, renewal means of an allocation optimization model 302, means for renewal stop judgment 303, searched point selection rules 304, an allocation optimization model 305, optimization control information 306, and an output unit 4.

Figure 2:
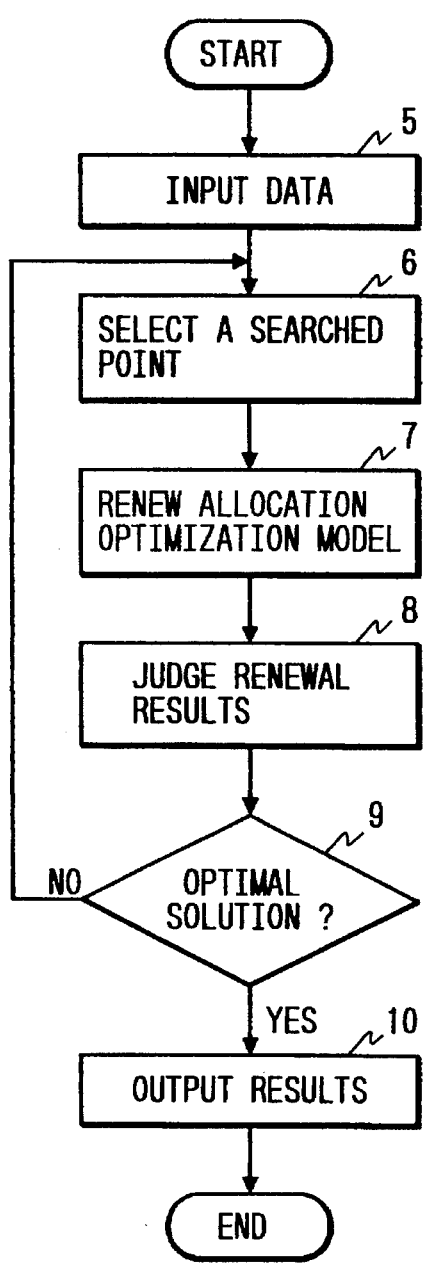
FIG. 2 a flow chart indicating the steps of the overall optimization process.

In FIG. 2, the overall optimization process of the present embodiment is shown. First, data are inputted at step 5 and stored in the memory 3. Successively, a searched point is selected by the searched point selection means 301 in step 6; and, in the step 7, the allocation optimization model 302 is renewed by the renewal means of an allocation optimization model 302 corresponding to the searched point selected in step 6. In the step 8, it is judged by the means of renewal stop judgement 303 if the searched point selected in step 7 gives an optimal solution. By the branch step 9, the steps 6, 7 and 8 are repeated until the optimal solution is obtained, and the obtained optimal solution is displayed by the output unit 4 in step 10.

Figure 3:
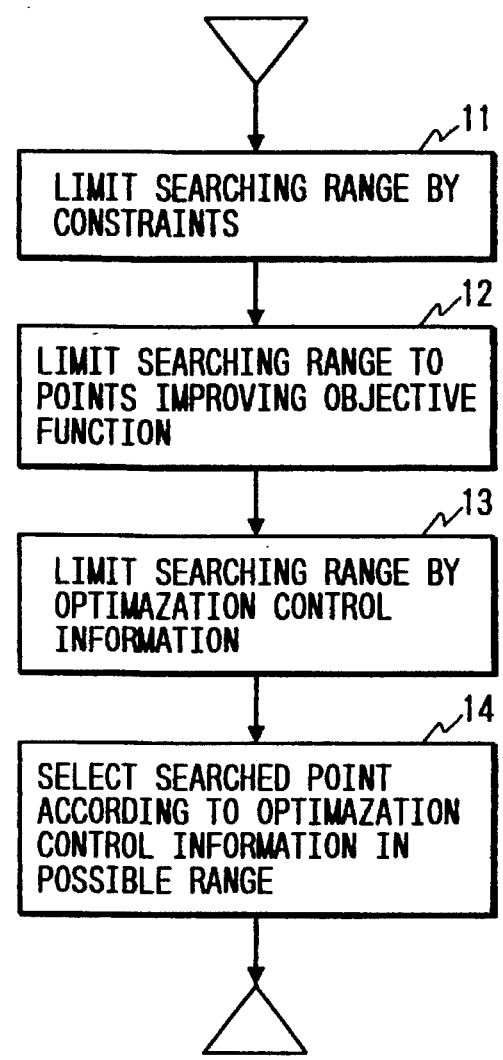
FIG. 3 is a flow chart indicating procedures for selecting a searched point.

In FIG. 3, a flow chart of the details of step 6 of FIG. 2 for selecting a searched point (namely sweep out) is shown. In step 11, the range for selecting searched points is limited by given constraints, and in step 12, the range is limited to the reached points which can improve the objective function. In step 13, the range is limited by the inputted optimization control information, and finally in the step 14, the next searched point is selected according to the inputted optimization control information in the possible range for selecting searched points.

Figure 4:
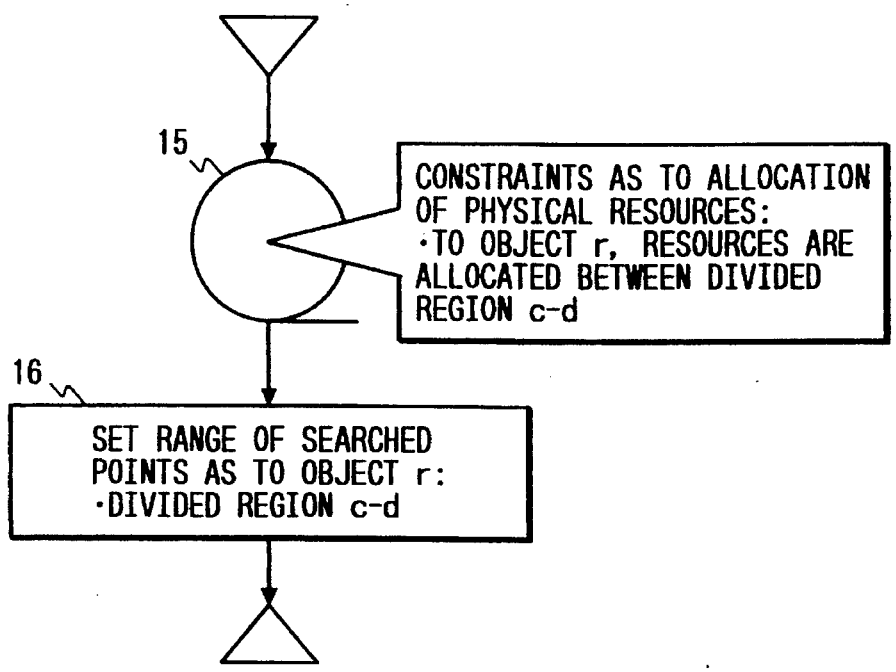
FIG. 4 is a flow chart indicating procedures for limiting the range of searched points conforming to resource allocation constraints.

In FIG. 4, a flow chart of the details of step 11 of FIG. 3 is shown. If a constraint, "Resources should be allocated between divided regions c–d to object r", is inputted in the data 15 as a constraint to a physical resource allocation, the range of divided region c–d is designated as the range of searched points 16 as to object r. Hereupon, the divided regions are the aggregation of arranged small regions obtained by dividing the whole allocation base region on which resources are allocated to each object.

Figure 5:
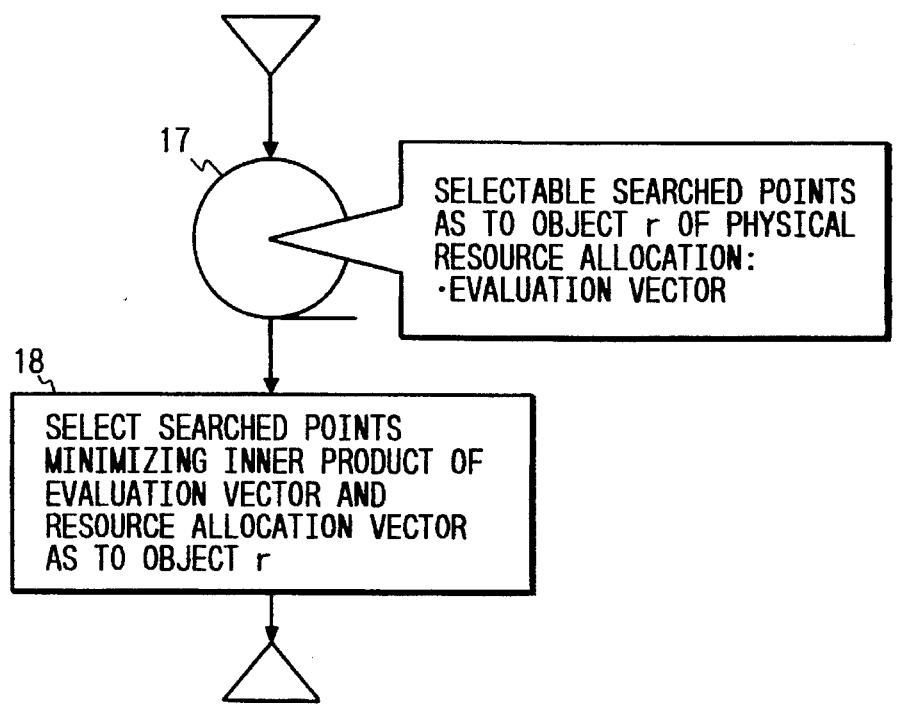
FIG. 5 is a flow chart indicating procedures for limiting the range of searched point in regard to the objective function improvement.

In FIG. 5, a flow chart of the details of step 12 of FIG. 3 is shown. Based on the data 17 of selectable searched points as to object r and the evaluation vector, a searched point minimizing the evaluation index, namely, the inner product of the evaluation vector and the resource allocation vector is selected to object r in step 18. Then the aggregation of the searched points selected for all objects in the procedure 18 are designated as the possible range of searched points concerning the objective function. The evaluation vector is obtained from the present resource allocation stack vector used in the quadratic objective function. The resource allocation vectors are the vectors representing all possible resource allocations as to each object. Each resource allocation vector corresponds to each possible 0–1 combinatorial pattern of the variables as to each object. Hereupon, the variables for describing the states of searched points represent the states of resource allocation for the divided regions concerning each object, and to the variables, 0 or 1 is assigned as value.

Figure 6:
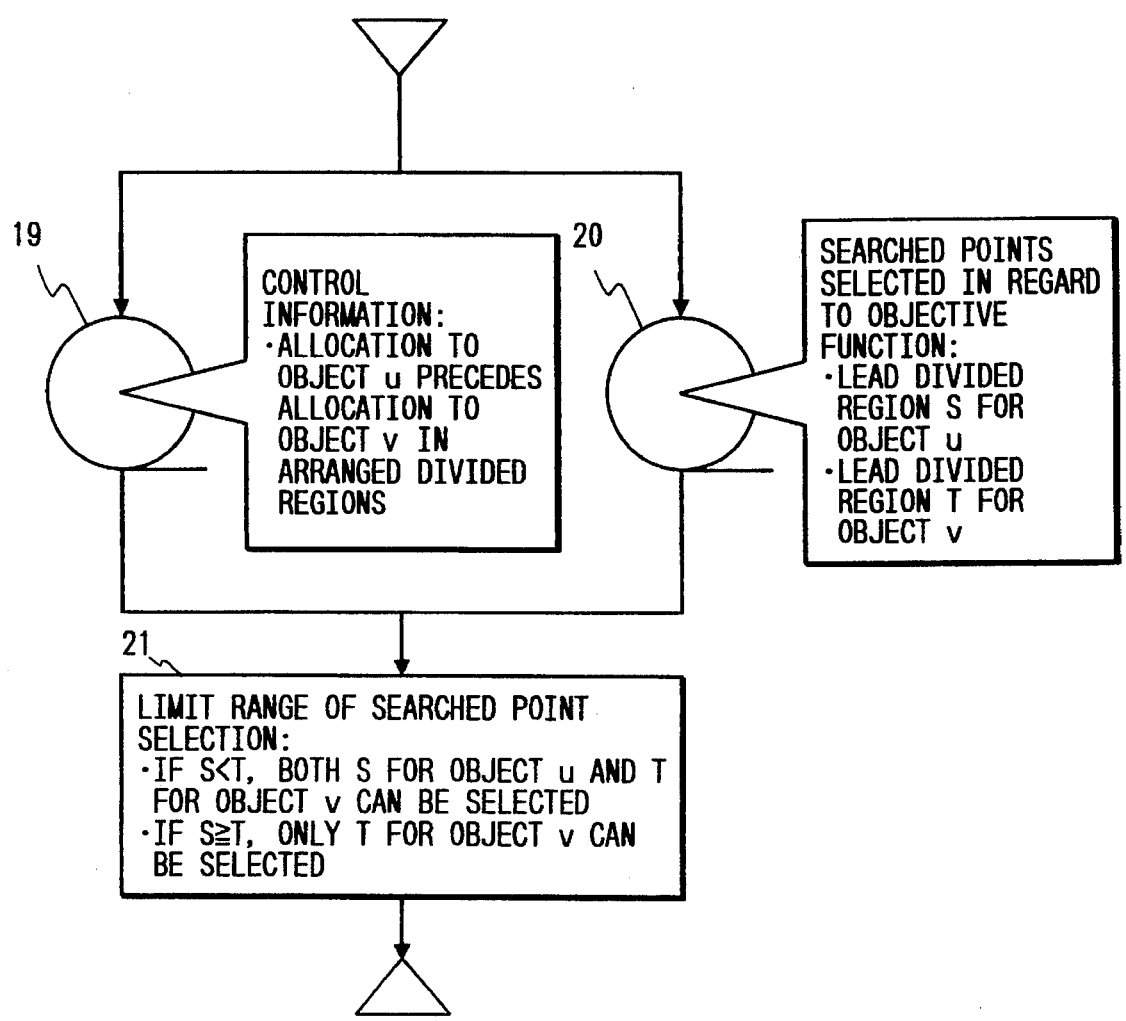
FIG. 6 is a flow chart indicating procedures for limiting the range of searched points by control information to the resource allocation.

In FIG. 6, a flow chart of the details of step 13 of FIG. 3 is shown. If control information, "Allocation to object u should precede allocation to object v in the arranged divided regions", is inputted to the data 19, only the searched points satisfying the constraints of data 19 are selected as the selectable searched points from the data 20 of the searched points selected concerning improvement of the objective function. In this case, if S<T, both S to object u and T to object v can be selected, otherwise, only T to object v can be selected, in step 21. Hereupon, S, T are signs indicating the divided regions arranged in a certain order.

Figure 7:
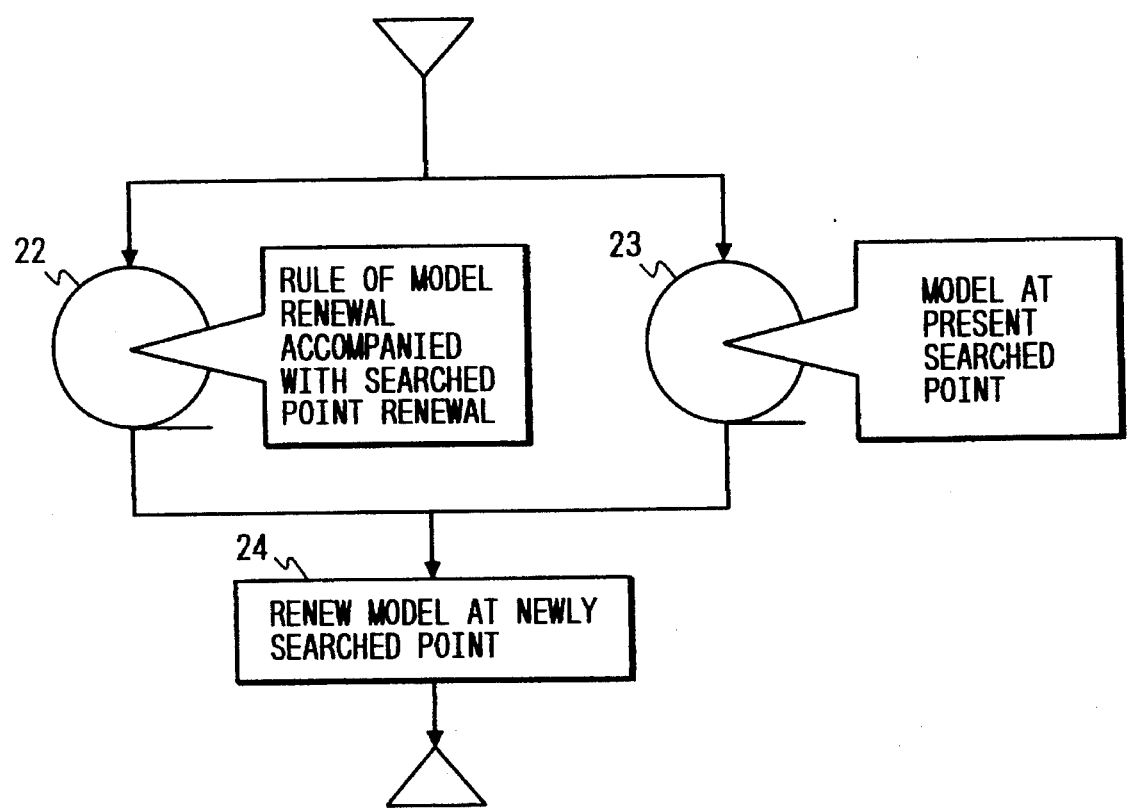
FIG. 7 is a flow chart indicating procedures for renewing a resource allocation optimization model.

In FIG. 7, a flow chart of the details of step 7 of FIG. 2 for renewing the allocation optimization model is shown. The data 23 representing the allocation optimization model at the present searched point are renewed in step 24 based on the data 22 of a rule for model renewal.

Figure 8:
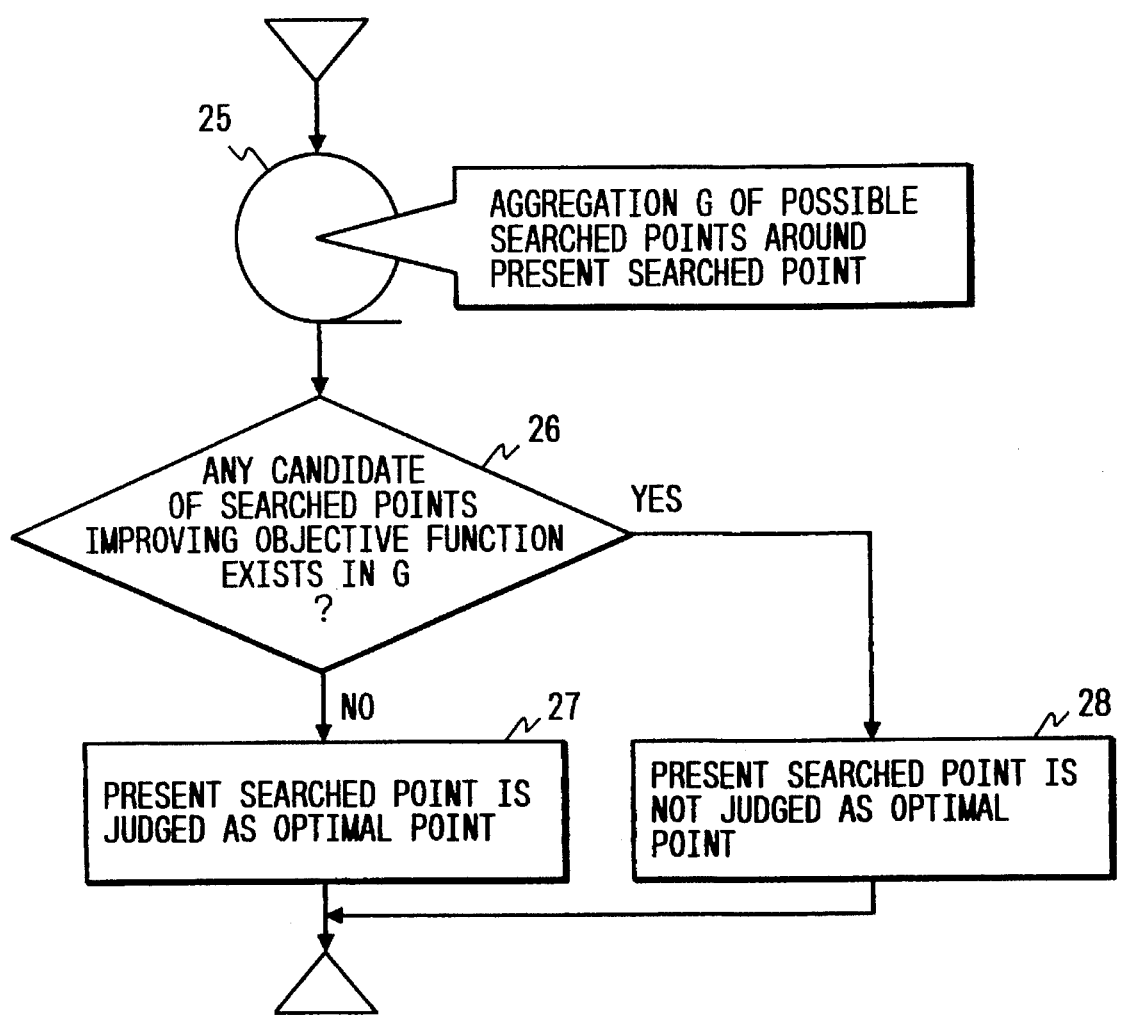
FIG. 8 is a flow chart indicating procedures for judging results the model renewal.

In FIG. 8, a flow chart of the details of step 8 of FIG. 2 for judging results of the searched point renewal is shown. It is judged at the branch procedure 26 if there is any candidate of searched points which serves to further improve the objective function in the data 25 of aggregation G of searched points around the present searched point. If no candidate of searched points can be found, it is judged that the present searched point gives the optimal solution. Otherwise, it is judged that the present searched point is not the optimal one and the searching is repeated.

(Embodiment 2)

Figure 15:
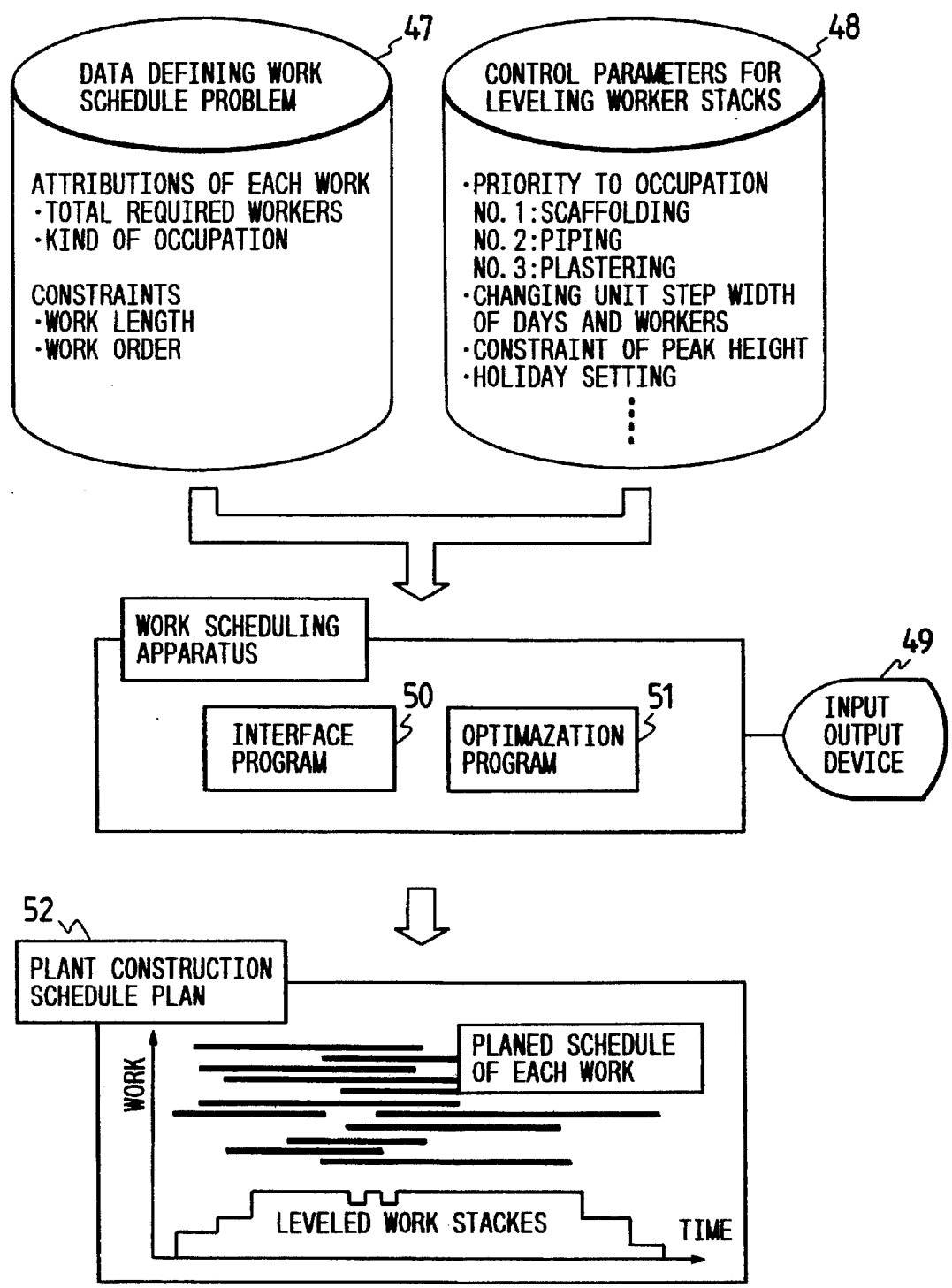
FIG. 15 shows an example of inputted data and outputted results of the work scheduling using the present invention.
Figure 16:
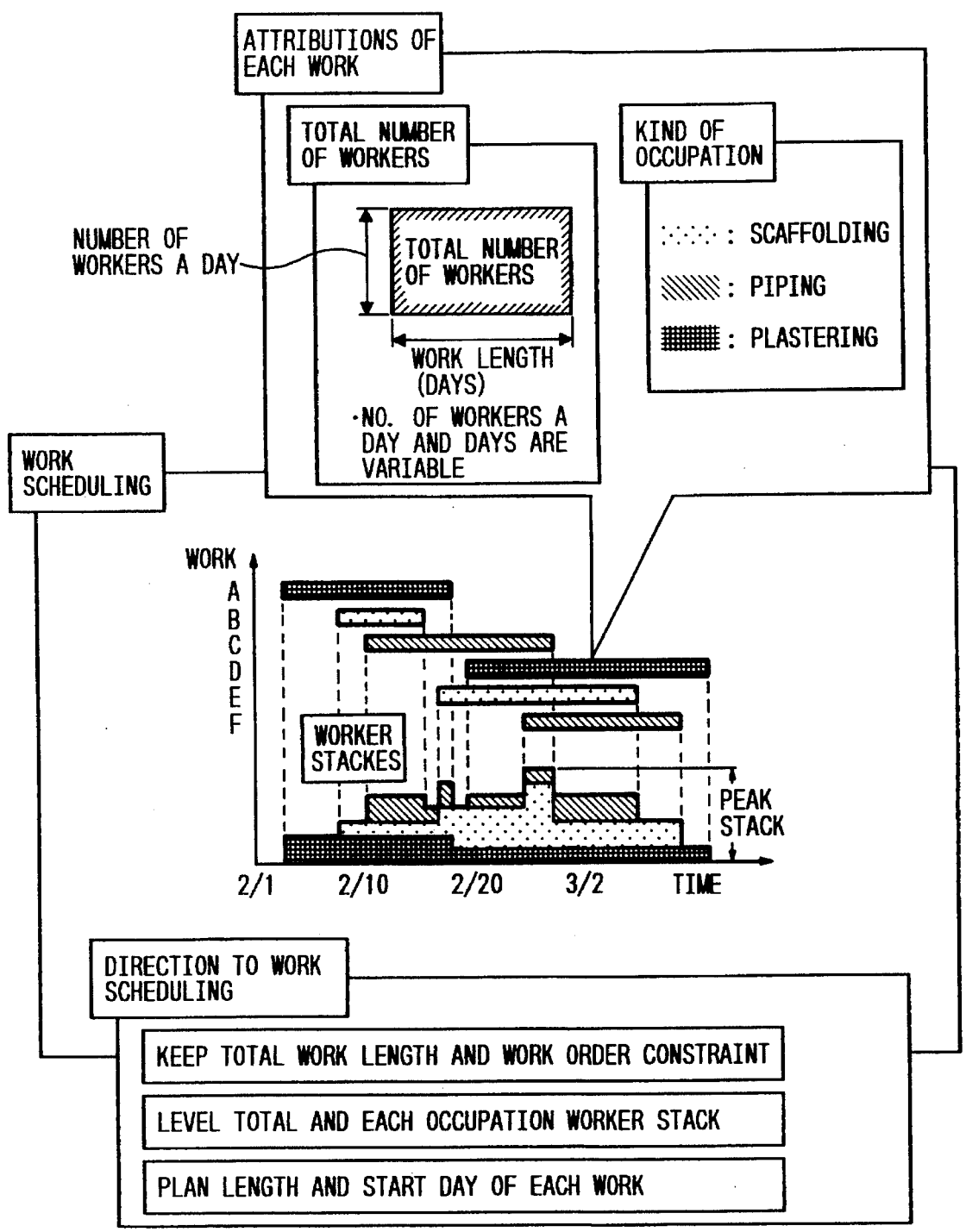
FIG. 16 shows an example of leveling workers stacks of a work scheduling problem.

Next, an embodiment of plant construction work scheduling using a resource allocation optimization method based on the present invention, of which the aim is to level worker stacks, is explained by reference to FIGS. 9–16. In plant construction work scheduling aiming to level worker stakes, working length, the number of workers a day and a starting day for each work task are arranged so that worker stacks over the whole working period are as equal as possible. In FIG. 16, an schedule example arranging the working length and the starting day (the total number of workers for each work task is maintained) to each work A, B, C, D, E and F is shown. In the work schedule, three kinds of occupation, that is, scaffolding, piping and plastering are considered in leveling the worker stacks.

In the established work scheduling, such constraints as each of work length, work order and so on are kept. Optimization process of work scheduling, as one of the combinatorial optimization planning, can be modeled as follows.

In modeling the schedule for K kinds of work, the whole working period L and the required worker number $h_{ij}$ to the j-th day of the i-th work of which the work length is $t_i$ (days), are given.

The work scheduling can be described as a problem for minimizing the value of the objective function f represented by equation (4) under the constraints represented by equations (1), (2) and (3)

$$x_{ij} = 0, 1 \ (i = 1, 2, \ldots K, j = 1, 2, \ldots L) \quad (1)$$

$$\sum_{j=1}^{L} x_{ij} = 1 \quad (2)$$

$$\sum_{i=1}^{k} \sum_{j=b_i}^{m} h_i(m - j + 1) x_{ij} = y_m \quad (3)$$

where $$b_i = 1 \ (m < t_i)$$
$$b_i = m - t_i + 1 \ (m \geq t_i)$$
$$(m = 1, 2, \ldots L)$$

$$f = \sum_{j=1}^{L} y_j^2 \quad (4)$$

By combining equations (1) and (2), and representing them in a matrix form, the two equations can be described by equation (5).

$$Ax = y \quad (5)$$

where A is the (L, KL) matrix and x is the column vector having components of column $x_i$, namely $$x = \begin{pmatrix} x_1 \\ \cdot \\ \cdot \\ \cdot \\ x_i \\ \cdot \\ \cdot \\ \cdot \\ x_K \end{pmatrix} \quad (6)$$

and $x_i$ is the column vector described by equation (7)

$$x_i = \begin{pmatrix} x_{i1} \\ \cdot \\ \cdot \\ \cdot \\ x_{ij} \\ \cdot \\ \cdot \\ \cdot \\ x_{iL} \end{pmatrix} \quad (7)$$

Hereupon, by expressing the basic vector, the basic matrix, the non-basic vector and the non-basic matrix as $x_B$, $A_B$, $x_n$ and $A_n$, respectively, equation (5) can be rewritten as equation (8)

$$y = A_B x_B + A_n x_n \quad (8)$$

where $A_B$ is the (L, K) matrix and $A_n$ is the (L, K(L-1)) matrix and $x_B$ is the K dimensional column vector of which all components have a value of 1 and $x_n$ is the K(L-1) dimensional column vector of which all components have a value of 0.

Using the worker stack vector over the whole working period expressed by equation (8), the objective function f is represented as equation (9)

$$f = y^T \cdot y \quad (9)$$

Then, the work schedule optimization involves a process for searching the basic vector and the basic matrix to minimize the objective function f.

An example of input data for the work scheduling is shown in TABLE 1. A limitation as to starting day of each work is given as a constraint and a work order or work priority is given as optimization control information.

| INPUT ITEM | CONTENTS |
| --- | --- |
| CONSTRAINTS | STARTING DAY OF WORK r SHOULD BE FROM c TH DAY TO d TH DAY |
| CONTROL INFORMATION | • WORK u SHOULD START BEFORE WORK v (ORDER CONTROL)<br>• ALLOCATION OF WORK p SHOULD TAKE PRECEDENCE OVER THAT OF WORK q (PRIORITY CONTROL) |

Figure 9:
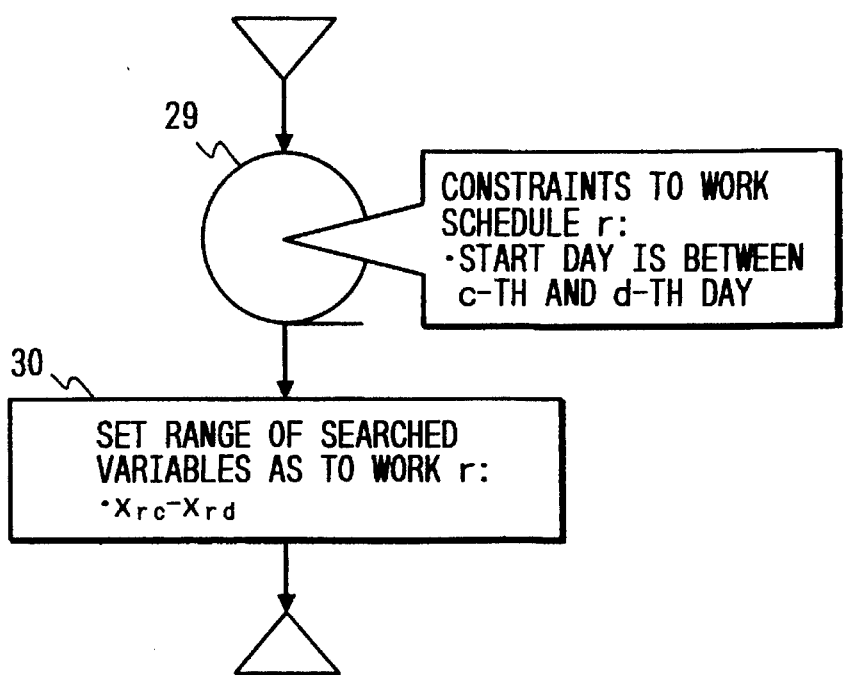
FIG. 9 shows a process for limiting the range of searched variables conforming to constraints of work scheduling.

In FIG. 9, a flow chart of the procedure 11 of FIG. 3 in the case of the work scheduling is shown. If a constraint, "The starting day of work r should be from s-th day to t-he day", is stored in the constraint data 29, the variable range of $x_{rs}$–$x_{rt}$ is designated as the range of searched variable 30 as to work r.

Figure 10:
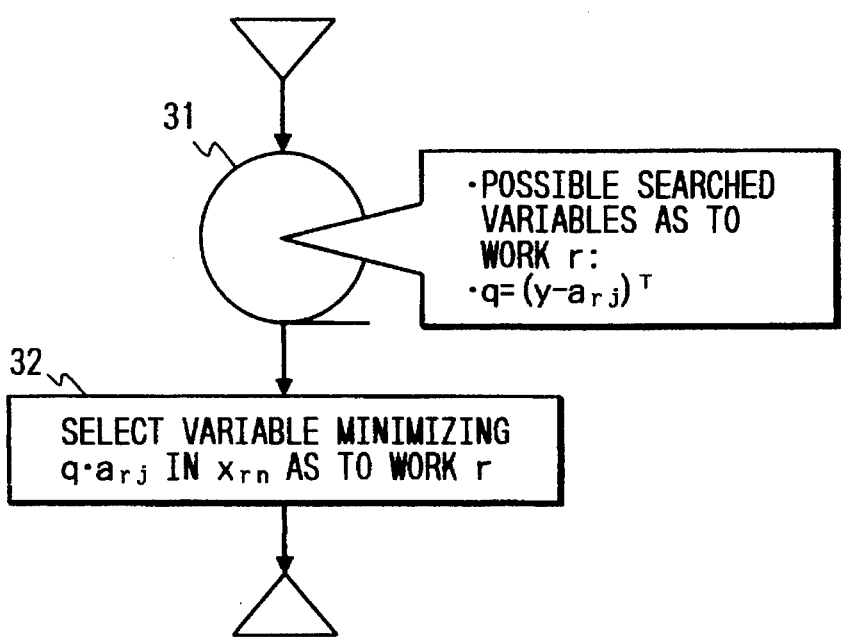
FIG. 10 shows a process for limiting the range of searched variables in regard to the objective function improvement of the work scheduling.

In FIG. 10, a flow chart of the details of step 12 of FIG. 3, in the case of the work scheduling is shown. In order to obtain an evaluation index for simply evaluating an improvement of the objective function f, the raw vector q defined by equation (10) is introduced, where $a_{rj}$ is the r-th column vector of the present step basic matrix $A_B$ concerning the basic variable $x_{rj}$ as to the noticed work r.

$$q = (y - a_{rj})^T \quad (10)$$

By using the possible searched variables and vector q, the evaluation index may be defined as the inner product of raw vector q and $a_{rj}$, where $a_{rj}$, is the column vector of the non basic matrix $A_n$ corresponding to the non basic variable $x_{rj}$, examined to become a new basic variable. In the step 32, one variable minimizing the inner product $q \cdot a_{rj}$, is selected for each work. Then, the aggregation of the variables selected is designated as the possible range of searched variables concerning the objective function. The simple evaluation index of $q \cdot a_{rj}$, considerably improve the efficiency of optimal solution search.

Figure 11:
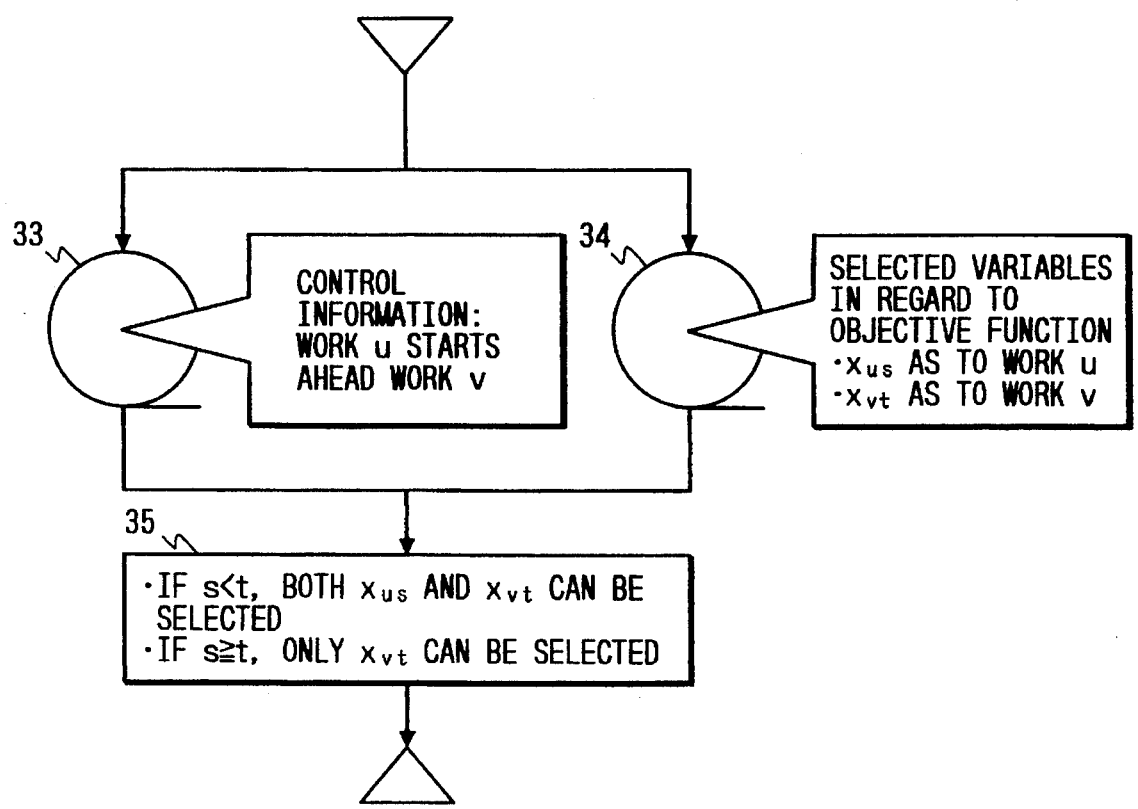
FIG. 11 shows the process for limiting the range of searched variables by control information of the work scheduling optimization.

In FIG. 11, a flow chart of the details of step 13 of FIG. 3, in the case of the work scheduling, is shown. If an order control constraint, "Work u should start before work v", is stored in the data 33 as control information, only the variables satisfying the constraints data 29 are selected as the selectable variables from the data 34 of the possible range of searched variables designated concerning the objective function. In this case, if s<t, both $x_{vs}$ and $x_{vt}$ is selectable, otherwise, only $x_{vt}$ can be selected, in the procedure 35.

Figure 12:
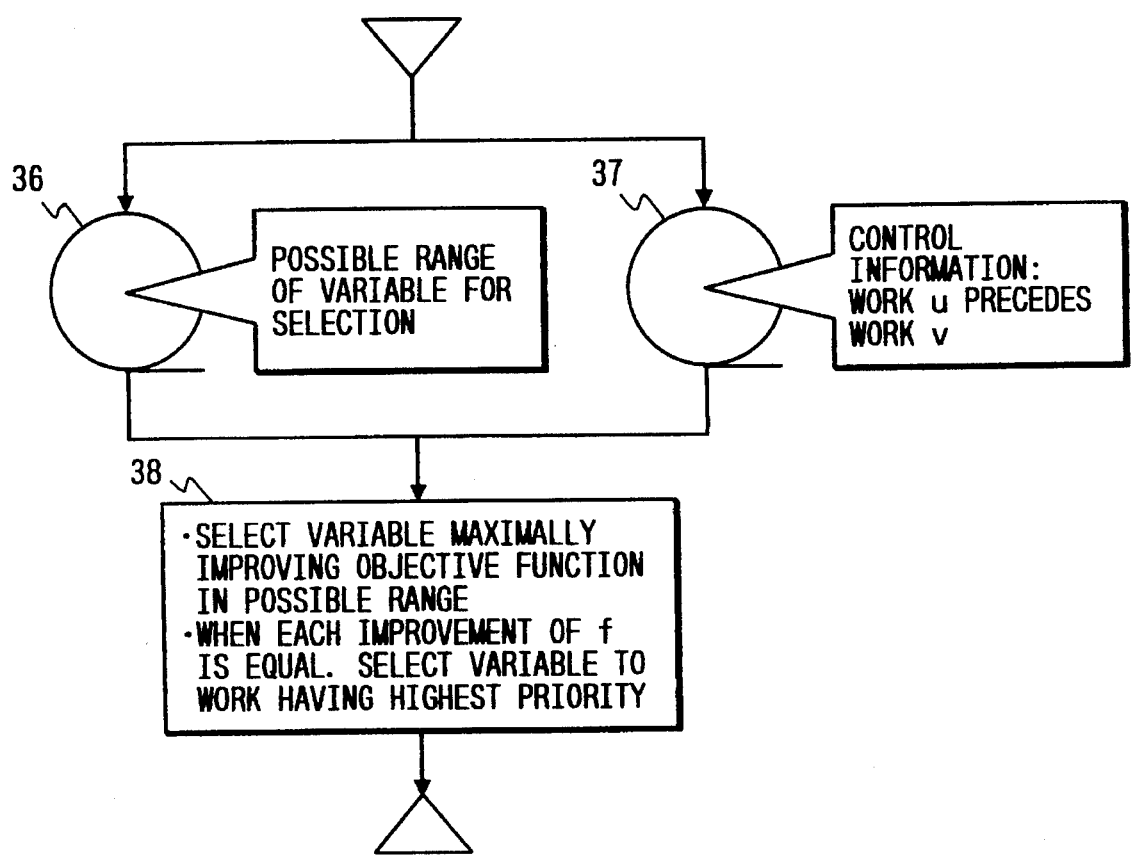
FIG. 12 shows the process for selecting variables in the possible range of searched variables of the work scheduling.

In FIG. 12, a flow chart of the details of step 14 of FIG. 3, in the case of the work scheduling, is shown. In step 38, a variable which provides the most improvement in the objective function is selected in the possible range of searched variables 36 designated through the procedures of steps 11, 12 and 13, considering the control information, e.g., the data 37 of work priority.

Figure 13:
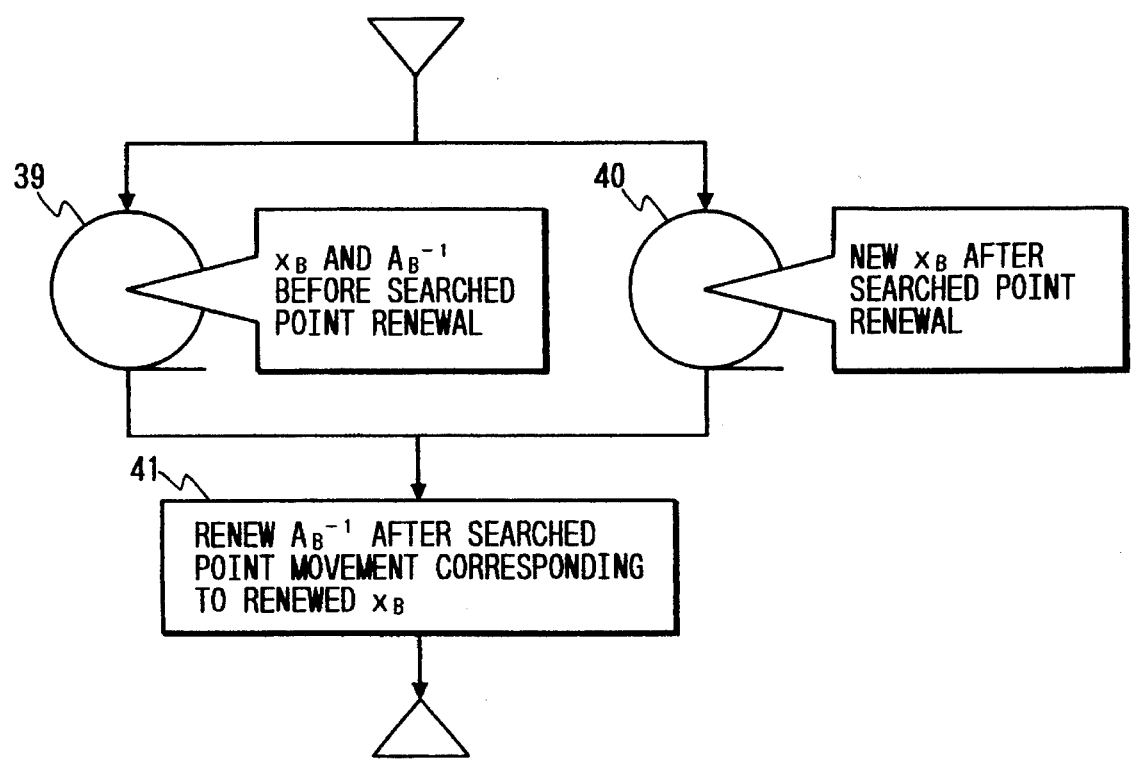
FIG. 13 shows the process for renewing the allocation optimization model of the work scheduling.

In FIG. 13, a flow chart of the details of step 7 of FIG. 2, in the case of the work scheduling, is shown. The model represented by equation (8) is renewed by changing the basic matrix $A_B$ and the non basic matrix $A_n$ corresponding to the change of basic variable $x_B$ in the procedure of step 6 of FIG. 2.

Figure 14:
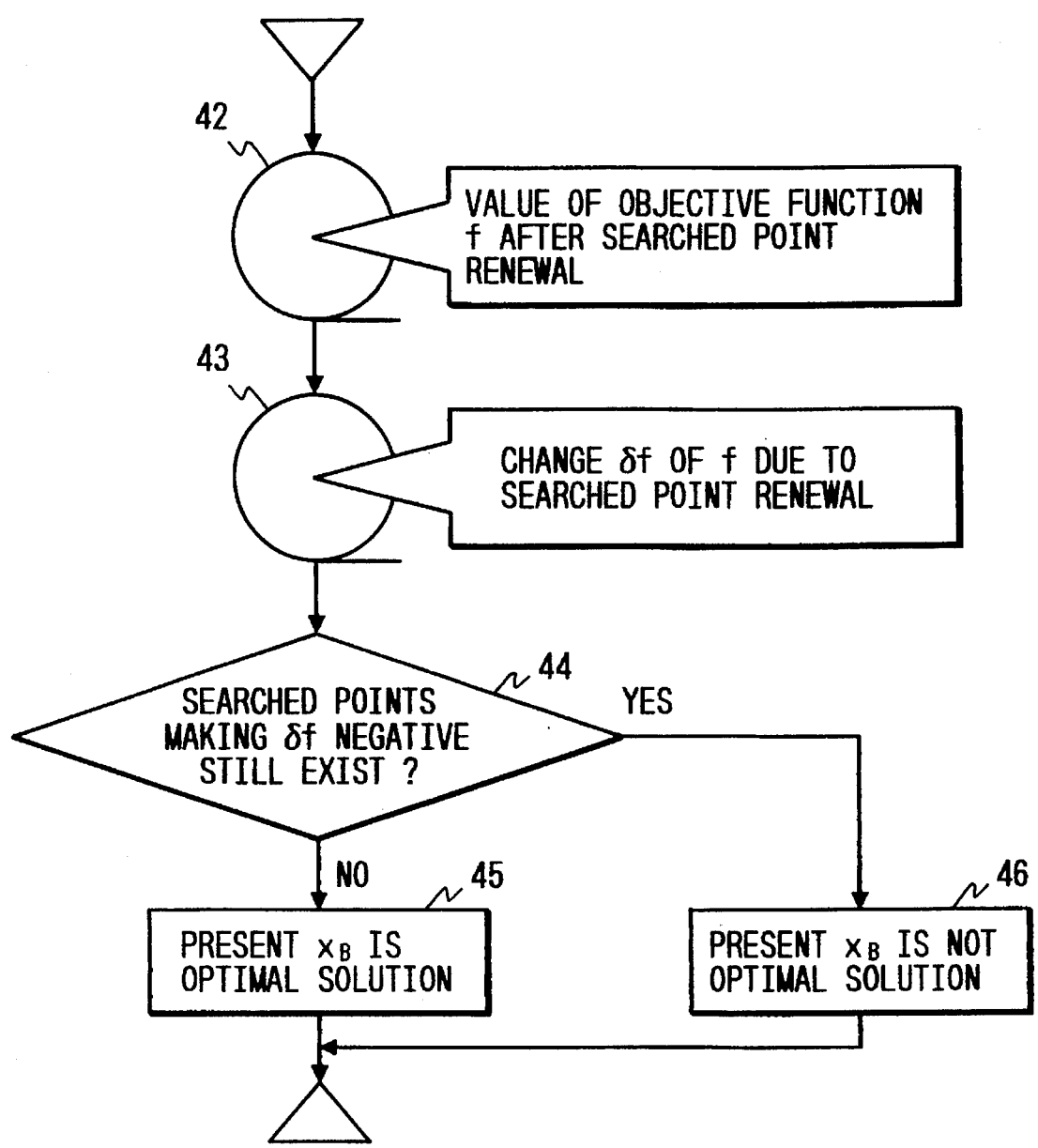
FIG. 14 shows the process for judging results of the model renewal of the work scheduling.

In FIG. 14, a flow chart of the details of step 8 of FIG. 2, in the case of the work scheduling, is shown. A change value δf 42 of the objective function f, obtained by using the evaluation index, is estimated by using the data about the objective function in moving a searched point when the searched point can be still more moved to the neighboring points. And, in the branch procedure 44, if there exist some neighboring points which make the change value δf negative, the process is passed to the procedure 46 wherein the present step searched point is judged as not giving the optimal solution, otherwise, the process is passed to the procedure 45 where the present step searched point is judged to give the optimal solution.

In the embodiment of the present invention relating to plant construction work scheduling, a user can easily input the data defining a work schedule problem and the optimization control data according to displayed guidance for inputting the data wherein the data are itemized and visualized. For example, as shown in FIG. 15, the input items are displayed in the form of a menu, such as data defining the work schedule problem 47, control parameters for leveling worker stacks 48 and so forth on an input output device 49. A user can simply input the data by picking parameters on the displayed menu. The input data are processed by interface program 50 and optimization program 51, and finally a plant construction work schedule plan 52 is displayed on the device 49.

The present invention is applicable to another combinatorial optimization problem, such as a blanking problem.

By using a high speed algorithm based on the present invention for resource allocation optimizing, efficiency in searching for an optimal solution is considerably improved, which makes it possible to take various kinds of optimization control parameters into consideration, to enlarge the scale of treatable problems and to automatically make optimal resource allocation plans.

What is claimed is:

1. A method of optimizing allocation of plural usable physical resources to allocation objects, executed in a resource allocation planning support system using a resource allocation optimization model stored in a memory and processed by a calculating unit, said model represented by linear allocation constraints, an allocation state description of each allocation object and a quadratic objective function, comprising the steps of:

inputting input data designating available physical resources, said linear allocation constraints, a specification of said allocation objects, and an initial state of said each allocation object;

storing said input data in said memory;

iteratively selecting, using a means for optimizing, a variable describing a resource allocation state of said resource allocation optimization model to be changed using a variable selection rule based on an evaluation vector representing present resource allocation stacks of all allocation objects;

renewing, using said means for optimizing, a variable of said resource allocation optimization model using the variable selected in said interactively selecting step;

judging, using said means for optimizing, termination of said iteratively selecting step for selecting said variable based on an evaluation index provided for evaluating whether an improvement of said quadratic objective function is obtained, said quadratic objective function being made of said resource allocation stacks of all allocation objects;

storing variables finally obtained when said quadratic objective function cannot be further improved, as an optimized resource allocation in said memory; and visually outputting a plan for allocating said physical resources to said each allocating objects by using said optimized resource allocation stored in said memory.

2. A method of optimizing allocation of plural usable physical resources to allocation objects, executed in a resource allocation planning support system using a resource allocation optimization model stored in a memory and processed by a calculating unit, said model represented by linear allocation constraints, an allocation state description of each allocation object represented by 0 or 1 variables assigned to all divided regions covering the entire allocation base region and an objective function described as a quadratic summation of resource stacks allocated to each of the divided regions of each said allocation object, comprising the steps of:

inputting input data designating available physical resources, said linear allocation constraints, a specification of said allocation objects, and an initial state of said each allocation object;

iteratively selecting, using a means for optimizing, a variable describing a resource allocation state of said resource allocation optimization model to be changed by a variable selection rule based on an evaluation vector representing present resource allocation stacks of all allocation objects, characterized by using an evaluation index for evaluating a value change of said objective function brought out by variable selection, defined by an inner product of an evaluation vector representing present resource allocation stacks of all allocation objects and a vector representing the new resource allocation corresponding to a newly selected variable as to an allocation object, and iteratively selecting variables to be renewed to minimize said evaluation index;

renewing, using said means for optimizing, a variable of said resource allocation optimization model using the variable selected in said iteratively selecting step;

judging, using said means for optimizing, termination of said iteratively selecting step for selecting said variable by evaluating whether improvement of said objective function is obtained by using said evaluation index, said objective function being made of said resource allocation stacks of all allocation objects;

storing variables finally obtained when said objective function cannot be further improved, as an optimized resource allocation in said memory; and visually outputting a plan for allocating said physical resources to said each allocating objects by using said optimized resource allocation stored in said memory.

3. A resource allocation planning support system for optimizing allocation of plural usable physical resources to allocation objects using a resource allocation optimization model stored in a memory and processed by a calculating unit, comprising:

a means for inputting input data designating available physical resources, linear allocation constraints, a specification of said allocation objects, and an initial state of each allocation object, said input data for controlling said optimizing allocation of plural usable physical resources;

a memory storing said input data;

a means for optimizing said resource allocation by iteratively selecting a variable describing the resource allocation state to be changed in a resource allocation optimization model represented by said linear allocation constraints, an allocation state description represented by 0 or 1 variables assigned to all divided regions covering the entire allocation base region and a quadrative objective function based on a variable selection rule based on an evaluation vector representing present resource allocation stacks of all allocation objects, characterized by using an evaluation index for evaluating a value change of said objective function brought out by variable selection, defined by an inner product of said evaluation vector representing present resource allocation stacks of all allocation objects and a vector representing a new resource allocation corresponding to a newly selected variable as to an allocation object, and including means for selecting variables to be renewed to minimize said evaluation index, for renewing a variable of said resource allocation optimization model corresponding to the variable iteratively selected by said means for optimizing, and for judging termination of iterative selection by said means for optimizing based on an evaluation index provided for evaluating whether an improvement of said quadratic objective function is obtained;

a means for storing intermediate and final results of said optimizing process when said quadratic objective function cannot be further improved, as an optimized resource allocation in said memory; and an output means for outputting a plan for allocating said physical resources to said each allocating objects by using said optimized resource allocation stored in said memory.

4. A resource allocation planning support system for optimizing allocation of plural usable physical resources to allocation objects using a resource allocation optimization model stored in a memory and processed by a calculating unit, comprising:

a means for inputting input data designating available physical resources, linear allocation constraints, a specification of said allocation objects, and an initial state of each allocation object, said input data for controlling said optimizing allocation of plural usable physical resources;

a memory storing said input data;

a means for optimizing said resource allocation by iteratively selecting a variable to be changed in a resource allocation optimization model represented by linear allocation constraints, an allocation state description represented by 0 or 1 variables assigned to all divided regions covering the entire allocation base region and a quadrative objective function based on a variable selection rule, characterized by using an evaluation index for evaluating a value change of said objective function brought out by said variable selection, defined by an inner product of an evaluation vector representing present resource allocation stacks of all allocation objects and a vector representing a new resource allocation corresponding to a newly selected variable as to an allocation object, and including means for selecting variables to be renewed to minimize said evaluation index, for renewing a variable of said resource allocation optimization model corresponding to the selected variables, and for judging termination of said optimization of said optimizing process based on an evaluation index provided for evaluating whether an improvement of said quadratic objective function is obtained; and a means for outputting intermediate and final results of said optimizing process as a plan for allocating said physical resources to each allocating object;

wherein said means for inputting input data for controlling the optimizing process includes means for itemizing and visualizing said inputted information and for furnishing guidance in the inputting of said inputted information.

* * * * *